United States Patent
Satyan et al.

(10) Patent No.: US 8,204,281 B2
(45) Date of Patent: Jun. 19, 2012

(54) SYSTEM AND METHOD TO REMOVE ARTIFACTS FROM FINGERPRINT SENSOR SCANS

(75) Inventors: Pallavi Satyan, San Jose, CA (US); Philip Yiu Kwong Chan, San Jose, CA (US)

(73) Assignee: Validity Sensors, Inc., San Jose, CA (US)

( * ) Notice: Subject to any disclaimer, the term of this patent is extended or adjusted under 35 U.S.C. 154(b) by 1220 days.

(21) Appl. No.: 11/957,295

(22) Filed: Dec. 14, 2007

(65) Prior Publication Data
US 2009/0154779 A1  Jun. 18, 2009

(51) Int. Cl.
G06K 9/00  (2006.01)
(52) U.S. Cl. .............. 382/124; 382/294
(58) Field of Classification Search .......... None
See application file for complete search history.

(56) References Cited

U.S. PATENT DOCUMENTS

| | | | |
|---|---|---|---|
| 4,151,512 A | 4/1979 | Rigannati et al. |
| 4,310,827 A | 1/1982 | Asi |
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,758,622 A | 7/1988 | Gosselin |
| 4,817,183 A | 3/1989 | Sparrow |
| 5,076,566 A | 12/1991 | Kriegel |
| 5,109,427 A | 4/1992 | Yang |
| 5,140,642 A | 8/1992 | Hsu et al. |
| 5,305,017 A | 4/1994 | Gerpheide |
| 5,319,323 A | 6/1994 | Fong |

(Continued)

FOREIGN PATENT DOCUMENTS
DE  2213813 A1  10/1973
(Continued)

OTHER PUBLICATIONS

Wikipedia (Dec. 2006). "Integrated circuit." Revision as of Dec. 10, 2006. http://en.wikipedia.org/wiki/Integrated_circuit.*

(Continued)

Primary Examiner — Stephen R Koziol
Assistant Examiner — Barry Drennan
(74) Attorney, Agent, or Firm — Greenberg Traurig LLP; Cecily Anne O'Regan; William C. Cray

(57) ABSTRACT

A method and device for removing common artifacts, such as stiction, from fingerprint scans created by partial fingerprint scanners. The partial fingerprint scanner data is assessed to determine if successive partial fingerprint images are overly similar to each other, which can occur during stiction. If this similarity exceeds a preset threshold, then at least some of the overly similar partial images will be removed (redacted) from the overall image dataset. The complete overall image is generated from the redacted data set. This method is particularly useful for creating "intelligent" low-cost, low power partial fingerprint scanners and scanner driver chips that can pre-process the partial fingerprint data that is generated during the course of a finger swipe, and remove stiction artifacts on a real-time or near-real time basis using relatively simple and low power on-chip processing circuits, and then send the corrected data to more sophisticated processors for subsequent fingerprint analysis.

18 Claims, 7 Drawing Sheets

U.S. PATENT DOCUMENTS

| | | |
|---|---|---|
| 5,325,442 A | 6/1994 | Knapp |
| 5,420,936 A | 5/1995 | Fitzpatrick et al. |
| 5,422,807 A | 6/1995 | Mitra et al. |
| 5,456,256 A | 10/1995 | Schneider et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor et al. |
| 5,848,176 A | 12/1998 | Hara et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,999,637 A | 12/1999 | Toyoda et al. |
| 6,002,815 A | 12/1999 | Immega et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,317,508 B1 | 11/2001 | Kramer et al. |
| 6,320,394 B1 | 11/2001 | Tartagni |
| 6,332,193 B1 | 12/2001 | Glass et al. |
| 6,333,989 B1 | 12/2001 | Borza |
| 6,337,919 B1 | 1/2002 | Dunton |
| 6,346,739 B1 | 2/2002 | Lepert et al. |
| 6,347,040 B1 | 2/2002 | Fries et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,473,072 B1 | 10/2002 | Comiskey et al. |
| 6,509,501 B2 | 1/2003 | Eicken et al. |
| 6,539,101 B1 | 3/2003 | Black |
| 6,580,816 B2 | 6/2003 | Kramer et al. |
| 6,597,289 B2 | 7/2003 | Sabatini |
| 6,643,389 B1 | 11/2003 | Raynal et al. |
| 6,672,174 B2 | 1/2004 | Deconde et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,838,905 B1 | 1/2005 | Doyle |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,190,816 B2 | 3/2007 | Mitsuyu et al. |
| 7,194,392 B2 | 3/2007 | Tuken et al. |
| 7,194,393 B2 | 3/2007 | Wei |
| 7,197,168 B2 * | 3/2007 | Russo ............................ 382/125 |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,843,438 B2 | 11/2010 | Onoda |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,077,935 B2 | 12/2011 | Geoffroy et al. |
| 2001/0026636 A1 | 10/2001 | Mainguet |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |

| Publication No. | Date | Inventor |
|---|---|---|
| 2002/0133725 A1 | 9/2002 | Roy et al. |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen et al. |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka et al. |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0136200 A1 | 6/2005 | Durell et al. |
| 2005/0139656 A1 | 6/2005 | Arnouse |
| 2005/0162402 A1 | 7/2005 | Watanachote |
| 2005/0169503 A1 | 8/2005 | Howell et al. |
| 2005/0210271 A1 | 9/2005 | Chou et al. |
| 2005/0219200 A1 | 10/2005 | Weng |
| 2005/0231213 A1 | 10/2005 | Chou et al. |
| 2005/0238212 A1 | 10/2005 | Du et al. |
| 2005/0244038 A1* | 11/2005 | Benkley, III ............... 382/126 |
| 2005/0244039 A1 | 11/2005 | Geoffroy et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2009/0130369 A1 | 5/2009 | Huang et al. |
| 2009/0153297 A1 | 6/2009 | Gardner |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0119124 A1 | 5/2010 | Satyan |
| 2010/0123675 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0102567 A1 | 5/2011 | Erhart |
| 2011/0102569 A1 | 5/2011 | Erhart |
| 2011/0182486 A1 | 7/2011 | Valfridsson et al. |
| 2011/0214924 A1 | 9/2011 | Perezselsky et al. |

| | | | |
|---|---|---|---|
| 2011/0267298 | A1 | 11/2011 | Erhart et al. |
| 2011/0298711 | A1 | 12/2011 | Dean et al. |
| 2011/0304001 | A1 | 12/2011 | Erhart et al. |

FOREIGN PATENT DOCUMENTS

| | | |
|---|---|---|
| EP | 0929028 A2 | 1/1998 |
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1939788 A1 | 7/2008 |
| GB | 2331613 A | 5/1999 |
| GB | 2480919 | 12/2011 |
| JP | 04158434 A2 | 6/1992 |
| JP | 2005242856 | 9/2005 |
| WO | WO 90/03620 A1 | 4/1990 |
| WO | WO 98/58342 A1 | 12/1998 |
| WO | WO 99/28701 A1 | 6/1999 |
| WO | WO99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/0104012 A1 | 11/2005 |
| WO | WO 2005/106774 A2 | 11/2005 |
| WO | WO 2005/106774 A3 | 11/2005 |
| WO | WO 2006/040724 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/053797 A1 | 5/2011 |

OTHER PUBLICATIONS

Galy et al. (Jul. 2007) "A full fingerprint verification system for a single-line sweep sensor." IEEE Sensors J., vol. 7 No. 7, pp. 1054-1065.*

Matsumoto et al., Impact of Artificial "Gummy" Fingers on Fingerprint Systems, SPIE 4677 (2002), reprinted from cryptome.org.

Maltoni, "Handbook of Fingerprint Recognition", XP002355942 Springer, New York, USA, Jun. 2003 pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extra1/afstversl/wsk-i/hgt2008.pdf [retrieved on Mar. 29, 2011] pp. 127-134, paragraph 6.2.

Gassend, et al., "Controlled Physical Random Functions", In Proceedings of the 18th Annual Computer Security Conference, Las Vegas, Nevada, Dec. 12, 2002.

BELLAGIODESIGNS.COM (Internet Archive Wayback Machine, www.bellagiodesigns.com date: Oct. 29, 2005).

Wikipedia (Mar. 2003). "Integrated Circuit," http://en.wikipedia.org/wiki/integrated_circuit. Revision as of Mar. 23, 2003.

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

* cited by examiner

Figure 1
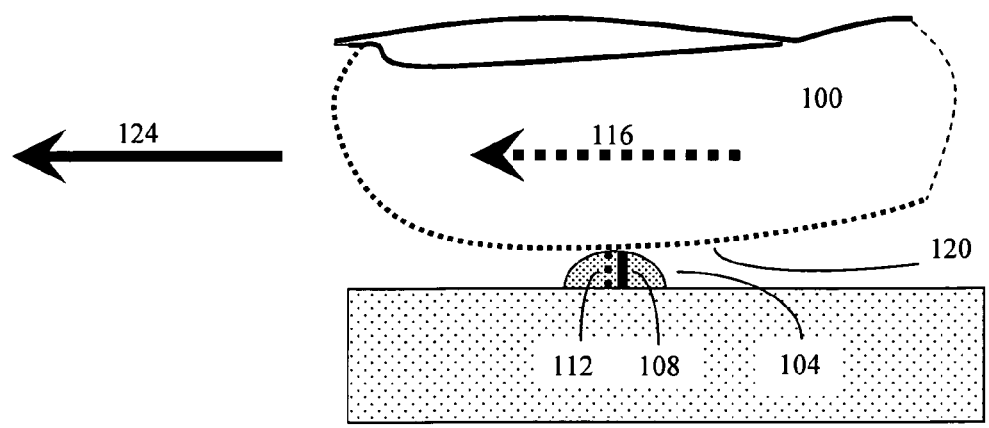
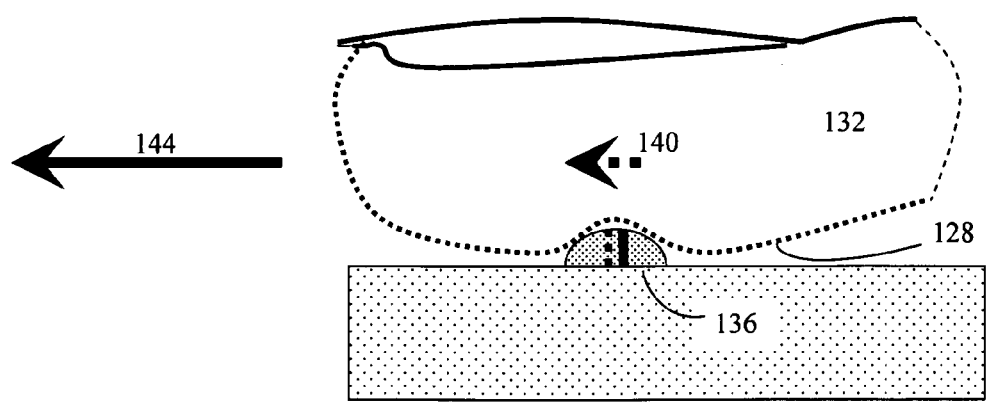

Figure 2

| Time | Location |
|------|----------|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |

| | | | | | | | | | | |
|---|---|---|---|---|---|---|---|---|---|---|
| 0 | 0 | 1 | 1 | 0 | 0 | 0 | 1 | 1 | 0 | 0 |
| 0 | 1 | 1 | 0 | 0 | 0 | 0 | 0 | 0 | 1 | 0 |
| 0 | 1 | 0 | 0 | 0 | 1 | 1 | 0 | 0 | 1 | 1 |
| 1 | 0 | 0 | 0 | 1 | 1 | 1 | 1 | 0 | 0 | 1 |
| 1 | 0 | 0 | 1 | 1 | 0 | 0 | 1 | 0 | 0 | 0 |
| 0 | 0 | 1 | 1 | 0 | 0 | 0 | 0 | 1 | 0 | 0 |
| 0 | 0 | 1 | 0 | 1 | 1 | 1 | 0 | 1 | 1 | 0 |
| 0 | 1 | 0 | 0 | 1 | 1 | 1 | 0 | 0 | 1 | 1 |
| 0 | 1 | 0 | 1 | 0 | 0 | 0 | 1 | 0 | 0 | 1 |
| 1 | 0 | 0 | 1 | 0 | 0 | 0 | 1 | 1 | 0 | 0 |
| 1 | 0 | 1 | 0 | 0 | 1 | 0 | 0 | 1 | 0 | 0 |
| 1 | 0 | 1 | 0 | 0 | 1 | 1 | 0 | 1 | 0 | 0 |
| 1 | 0 | 1 | 1 | 0 | 0 | 0 | 0 | 0 | 1 | 0 |
| 1 | 0 | 0 | 1 | 0 | 0 | 0 | 0 | 0 | 1 | 1 |
| 1 | 1 | 0 | 0 | 1 | 1 | 1 | 0 | 1 | 1 | 0 |
| 0 | 1 | 1 | 0 | 0 | 0 | 1 | 1 | 1 | 0 | 0 |
| 0 | 0 | 1 | 1 | 0 | 0 | 0 | 0 | 0 | 0 | 0 |
| 0 | 0 | 0 | 1 | 1 | 0 | 0 | 0 | 0 | 0 | 0 |
| 0 | 0 | 0 | 0 | 1 | 1 | 0 | 0 | 0 | 0 | 0 |
| 0 | 0 | 0 | 0 | 0 | 1 | 1 | 1 | 1 | 0 | 0 |
| 0 | 0 | 0 | 0 | 0 | 0 | 1 | 1 | 1 | 1 | 1 |

Figure 3

| Time | Location | | | | | | | | | | | |
|------|----------|---|---|---|---|---|---|---|---|---|---|---|
| 1  | 1.0  | 0 | 0 | 1 | 1 | 0 | 0 | 0 | 1 | 1 | 0 | 0 |
| 2  | 1.5  | 0 | 0 | 1 | 1 | 0 | 0 | 0 | 1 | 1 | 0 | 0 |
| 3  | 2.0  | 0 | 1 | 1 | 0 | 0 | 0 | 0 | 0 | 0 | 1 | 0 |
| 4  | 2.5  | 0 | 1 | 1 | 0 | 0 | 0 | 0 | 0 | 0 | 1 | 0 |
| 5  | 3.0  | 0 | 1 | 0 | 0 | 0 | 1 | 1 | 0 | 0 | 1 | 1 |
| 6  | 3.5  | 0 | 1 | 0 | 0 | 0 | 1 | 1 | 0 | 0 | 1 | 1 |
| 7  | 4.0  | 1 | 0 | 0 | 0 | 1 | 1 | 1 | 1 | 0 | 0 | 1 |
| 8  | 4.5  | 1 | 0 | 0 | 0 | 1 | 1 | 1 | 1 | 0 | 0 | 1 |
| 9  | 5.0  | 1 | 0 | 0 | 1 | 1 | 0 | 0 | 1 | 0 | 0 | 0 |
| 10 | 5.5  | 1 | 0 | 0 | 1 | 1 | 0 | 0 | 1 | 0 | 0 | 0 |
| 11 | 6.0  | 0 | 0 | 1 | 1 | 0 | 0 | 0 | 0 | 1 | 0 | 0 |
| 12 | 6.5  | 0 | 0 | 1 | 1 | 0 | 0 | 0 | 0 | 1 | 0 | 0 |
| 13 | 7.0  | 0 | 0 | 1 | 0 | 1 | 1 | 1 | 0 | 1 | 1 | 0 |
| 14 | 7.5  | 0 | 0 | 1 | 0 | 1 | 1 | 1 | 0 | 1 | 1 | 0 |
| 15 | 8.0  | 0 | 1 | 0 | 0 | 1 | 1 | 1 | 0 | 0 | 1 | 1 |
| 16 | 8.5  | 0 | 1 | 0 | 0 | 1 | 1 | 1 | 0 | 0 | 1 | 0 |
| 17 | 9.0  | 0 | 1 | 0 | 1 | 0 | 0 | 0 | 1 | 0 | 0 | 1 |
| 18 | 9.5  | 0 | 1 | 0 | 1 | 0 | 0 | 0 | 1 | 0 | 0 | 1 |
| 19 | 10.0 | 1 | 0 | 0 | 1 | 0 | 0 | 0 | 1 | 1 | 0 | 0 |
| 20 | 10.5 | 1 | 0 | 0 | 1 | 0 | 0 | 0 | 1 | 1 | 0 | 0 |
| 21 | 11.0 | 1 | 0 | 1 | 0 | 0 | 1 | 0 | 0 | 1 | 0 | 0 |
| 22 | 11.5 | 1 | 0 | 1 | 0 | 0 | 1 | 0 | 0 | 1 | 0 | 0 |
| 23 | 12.0 | 1 | 0 | 1 | 0 | 0 | 1 | 1 | 0 | 1 | 0 | 0 |
| 24 | 12.5 | 1 | 0 | 1 | 0 | 0 | 1 | 1 | 0 | 1 | 0 | 0 |
| 25 | 13.0 | 1 | 0 | 1 | 1 | 0 | 0 | 0 | 0 | 1 | 0 | 0 |
| 26 | 13.5 | 1 | 0 | 1 | 1 | 0 | 0 | 0 | 0 | 1 | 0 | 0 |
| 27 | 14.0 | 1 | 0 | 1 | 0 | 0 | 0 | 0 | 1 | 1 | 0 | 0 |
| 28 | 14.5 | 1 | 0 | 1 | 0 | 0 | 0 | 0 | 1 | 1 | 0 | 0 |
| 29 | 15.0 | 1 | 1 | 0 | 1 | 1 | 1 | 0 | 1 | 1 | 0 | 0 |
| 30 | 15.5 | 1 | 1 | 0 | 1 | 1 | 1 | 0 | 1 | 1 | 0 | 0 |
| 31 | 16.0 | 0 | 1 | 1 | 0 | 0 | 0 | 1 | 1 | 1 | 0 | 0 |
| 32 | 16.5 | 0 | 1 | 1 | 0 | 0 | 0 | 1 | 1 | 1 | 0 | 0 |
| 33 | 17.0 | 0 | 0 | 1 | 1 | 0 | 0 | 0 | 0 | 0 | 0 | 0 |
| 34 | 17.5 | 0 | 0 | 1 | 1 | 0 | 0 | 0 | 0 | 0 | 0 | 0 |
| 35 | 18.0 | 0 | 0 | 0 | 1 | 1 | 0 | 0 | 0 | 0 | 0 | 0 |
| 36 | 18.5 | 0 | 0 | 0 | 1 | 1 | 0 | 0 | 0 | 0 | 0 | 0 |
| 37 | 19.0 | 0 | 0 | 0 | 0 | 1 | 1 | 0 | 0 | 0 | 0 | 0 |
| 38 | 19.5 | 0 | 0 | 0 | 0 | 1 | 1 | 0 | 0 | 0 | 0 | 0 |
| 39 | 20.0 | 0 | 0 | 0 | 0 | 0 | 1 | 1 | 1 | 1 | 0 | 0 |
| 40 | 20.5 | 0 | 0 | 0 | 0 | 0 | 1 | 1 | 1 | 1 | 0 | 0 |
| 41 | 21.0 | 0 | 0 | 0 | 0 | 0 | 0 | 1 | 1 | 1 | 1 | 1 |
| 42 | 21.5 | 0 | 0 | 0 | 0 | 0 | 0 | 1 | 1 | 1 | 1 | 1 |

SYSTEM AND METHOD TO REMOVE ARTIFACTS FROM FINGERPRINT SENSOR SCANS

BACKGROUND

Partial fingerprint scanners are becoming popular for a wide variety of security applications. In contrast to "all at once" fingerprint scanners, which capture an image of an entire fingerprint at the same time, partial fingerprint sensing devices use a sensing area that is smaller than the fingerprint area to be imaged. By imaging only a portion of a fingerprint at any given time, the size and cost of a partial fingerprint sensor can be made considerably smaller and cheaper than that of a full fingerprint sensor. However to capture a full fingerprint image, the user must move his finger and "swipe" it across the sensing zone of the partial finger print sensor.

Various types of partial fingerprint readers exist. Some work by optical means, some by pressure sensor means, and others by capacitance sensing means or radiofrequency sensing means.

For example, one common configuration used for a fingerprint sensor is a one or two dimensional array of CCD (charge coupled devices) or C-MOS circuit sensor elements (pixels). These components are embedded in a sensing surface to form a matrix of pressure sensing elements that generate signals in response to pressure applied to the surface by a finger. These signals are read by a processor and used to reconstruct the fingerprint of a user and to verify identification.

Other devices include one or two dimensional arrays of optical sensors that read light reflected off of a person's finger and onto an array of optical detectors. The reflected light is converted to a signal that defines the fingerprint of the finger analyzed and is used to reconstruct the fingerprint and to verify identification.

Many types of partial fingerprint scanners are comprised of linear (1 dimensional) arrays of sensing elements (pixels). These one dimensional sensors create a two dimensional image of a fingerprint through the relative motion of the finger pad relative to the sensor array.

One class of partial fingerprint sensors that are particularly useful for small device applications are deep finger penetrating radio frequency (RF) based sensors. These are described in U.S. Pat. Nos. 7,099,496; 7,146,024; and patent application Ser. Nos. 11/107,682; 11/112,338; 11,243,100; 11/184,464, and the contents of these patents and patent applications are incorporated herein by reference. These types of sensors are commercially produced by Validity Sensors, Inc, San Jose Calif. This class of sensor mounts the sensing elements (usually arranged in a one dimensional array) on a thin, flexible, and environmentally robust support, and the IC used to drive the sensor in a protected location some distance away from the sensing zone. Such sensors are particularly advantageous in applications where small sensor size and sensor robustness are critical.

The Validity fingerprint sensors measure the intensity of electric fields conducted by finger ridges and valleys, such as deep finger penetrating radio frequency (RF) based sensing technology, and use this information to sense and create the fingerprint image. These devices create sensing elements by creating a linear array composed of many miniature excitation electrodes, spaced at a high density, such as a density of approximately 500 electrodes per inch. The tips of these electrodes are separated from a single sensing electrode by a small sensor gap. The electrodes are electrically excited in a progressive scan pattern and the ridges and valleys of a finger pad alter the electrical properties (usually the capacitive properties) of the excitation electrode—sensing electrode interaction, and this in turn creates a detectable electrical signal. The electrodes and sensors are mounted on thin flexible printed circuit support, and these electrodes and sensors are usually excited and the sensor read by an integrated circuit chip (scanner chip, driver chip, scan IC) designed for this purpose. The end result is to create a one dimensional "image" of the portion of the finger pad immediately over the electrode array and sensor junction.

As the finger surface is moved across the sensor, portions of the fingerprint are sensed and captured by the device's one dimensional scanner, creating an array of one dimensional images indexed by order of data acquisition, and/or alternatively annotated with additional time and/or finger pad location information. Circuitry, such as a computer processor or microprocessor, then creates a full two-dimensional fingerprint image by creating a mosaic of these one dimensional partial fingerprint images.

Often the processor will then compare this recreated two dimensional full fingerprint, usually stored in working memory, with an authorized fingerprint stored in a fingerprint recognition memory, and determine if there is a match or not. Software to fingerprint matching is disclosed in U.S. Pat. Nos. 7,020,591 and 7,194,392 by Wei et. al., and is commercially available from sources such as Cogent systems, Inc., South Pasadena, Calif.

If the scanned fingerprint matches the record of an authorized user, the processor then usually unlocks a secure area or computer system and allows the user access. This enables various types of sensitive areas and information (financial data, security codes, etc.), to be protected from unauthorized users, yet still be easily accessible to authorized users.

The main drawback of partial fingerprint sensors is that in order to obtain a valid fingerprint scan, the user must swipe his or her finger across the sensor surface in a relatively uniform manner. Unfortunately, due to various human factors issues, this usually isn't possible. In the real world, users will not swipe their fingers with a constant speed. Some will swipe more quickly than others, some may swipe at non-uniform speeds, and some may stop partially through a scan, and then resume. In order to account for this type of variation, modern partial fingerprint sensors often incorporate finger position sensors to determine, relative to the fingerprint sensor, how the overall finger position and speed varies during a finger swipe.

One type of finger position indicator, represented by U.S. Pat. No. 7,146,024, and application Ser. Nos. 11/112,338 and 11/107,682 (the contents of which are incorporated herein by reference) detects relative finger position using a long array of electrical drive plate sensors. These plates sense the bulk of a finger (rather than the fine details of the fingerprint ridges), and thus sense the relative position of the finger relative to the linear array used for fingerprint sensing. A second type of fingerprint position indicator, represented by U.S. patent Ser. No. 11/184,464 (the contents of which are incorporated herein by reference), uses two linear partial fingerprint sensors, located about 400 microns apart. The two linear sensors use the slight timing differences that occur when a fingerprint swipe first hits one sensor and then the other sensor to detect when a fingerprint edge passes over the sensors. This technique can also detect relative speed of passage over the two partial sensors. This type of information can be used to deduce overall finger location during the course of a fingerprint swipe.

In either case, once finger position is known, each of the one-dimensional partial fingerprint images can then be annotated with additional (and optional) time data (time stamp) or finger (finger tip, finger pad, fingerprint location) location data (location stamp). This optional annotation information, which supplements the "order of data acquisition" that would normally be used to keep track of the multiple stored partial fingerprint images in memory, can be used to help to correct distortions (artifacts) when the various one dimensional partial images are assembled into a full two dimensional fingerprint image.

For example, if the user momentarily stops moving the finger during the finger swipe, the system will generate a series of nearly identical partial (one dimensional) fingerprint images. These images will have different orders of acquisition, and differing time stamps, which could confuse a processor when it attempts to create a correct two dimensional full fingerprint image. However if the fingerprint scanner also has a finger position sensor, the finger location data stamp associated with these nearly identical one dimensional partial fingerprint images will provide evidence that the finger stopped because the finger location data linked to these various one-dimensional partial fingerprint images will be almost the same. The computer processor that reassembles the partial fingerprint images into the complete fingerprint image can be instructed or programmed to also analyze the finger position (location) data, and perform appropriate image corrections when the location data shows that the finger paused during a scan.

Fingers and fingertips are not totally rigid, however. Finger prints rest on a surface layer of skin, which in turn rests over a bed of non-rigid tissue, which in turn rests on bone. Finger tips are thus flexible and deformable, and also slightly sticky due to the innate property of skin, sweat glands, and the high surface area imparted by fingerprint ridges. Thus when a fingertip slides over a surface, there is a tendency for portions of the fingertip pad to momentarily adhere to the surface, while the top of the fingertip continues its motion. This is called "stiction". Eventually (usually within a fraction of a second), further motion of the finger tip and bone creates enough force to disrupt the momentary adhesion (stiction) between the finger pad skin and the surface, and the motion of the finger pad skin continues. However if, during this brief period of arrest (stiction), the fingertip skin is arrested over a partial fingerprint scanner, a short series of nearly identical repeated partial fingerprint images will be collected. These nearly identical images will have different order of acquisition indexes, and different time stamps. Because the tip of the finger may have continued in motion while the skin was arrested over the sensor, the nearly identical images may also have different finger position (location) stamps. However, these different finger location stamps are misleading because during the stiction event, the finger pad skin itself may not have moved.

Thus when a processor connected to the partial fingerprint sensor attempts to reassemble the series of one dimensional images into a complete two dimensional fingerprint, a distorted image will result. This distorted data is undesirable because it can confound security authorization schemes that require high quality, undistorted, fingerprint images. Efficient methods to correct for such fingerprint "stiction" artifacts are thus desirable.

BRIEF SUMMARY OF THE INVENTION

The present invention is a method for operating biometric sensors, such as partial fingerprint scanners, to remove common artifacts, such as stiction, that can create sensor artifacts. The method involves assessing the scanner data, determining if the data exhibits one or more known artifacts (such as stiction), and if so removing the artifacts from the data prior to subsequent data analysis.

In one embodiment, partial fingerprint scanner data is assessed to determine if successive partial (one dimensional) fingerprint images are overly similar to each other. If the degree of successive partial image similarity exceeds a preset threshold, then at least some of the overly similar partial images will be removed (redacted) from the overall image dataset. The complete overall (two dimensional) image is generated from the redacted data set.

This method is particularly useful for creating "intelligent" low-cost, low power, partial fingerprint scanners and scanner driver IC chips. These scanners and IC chips can pre-process the partial fingerprint data that is generated during the course of a finger swipe, and remove stiction artifacts on a real-time or near-real time basis. The method is compatible with simple and low-power electrical circuits, and thus is well suited for embedding into scanner driver IC circuits. After image artifacts are removed, the corrected fingerprint data can then be further analyzed as needed.

BRIEF DESCRIPTION OF THE DRAWINGS

FIG. 1 shows an example of a finger moving over a partial fingerprint scanner. This example also shows a momentary stiction event, which causes a portion of the finger pad to adhere to the partial fingerprint scanner, while the tip of the finger continues in motion.

FIG. 2 shows an example of a hypothetical fingerprint that has been captured by a partial (one dimensional) fingerprint scanner. The series of one dimensional images are annotated with capture time and fingerprint location information, and the results can then be reassembled into a complete two dimensional fingerprint scan.

FIG. 3 shows an example of the type of artifact that can result if the fingerprint is scanned too slowly, and also shows why it is useful to append time information to each partial (one dimensional) fingerprint image.

DETAILED DESCRIPTION

Figure 4:
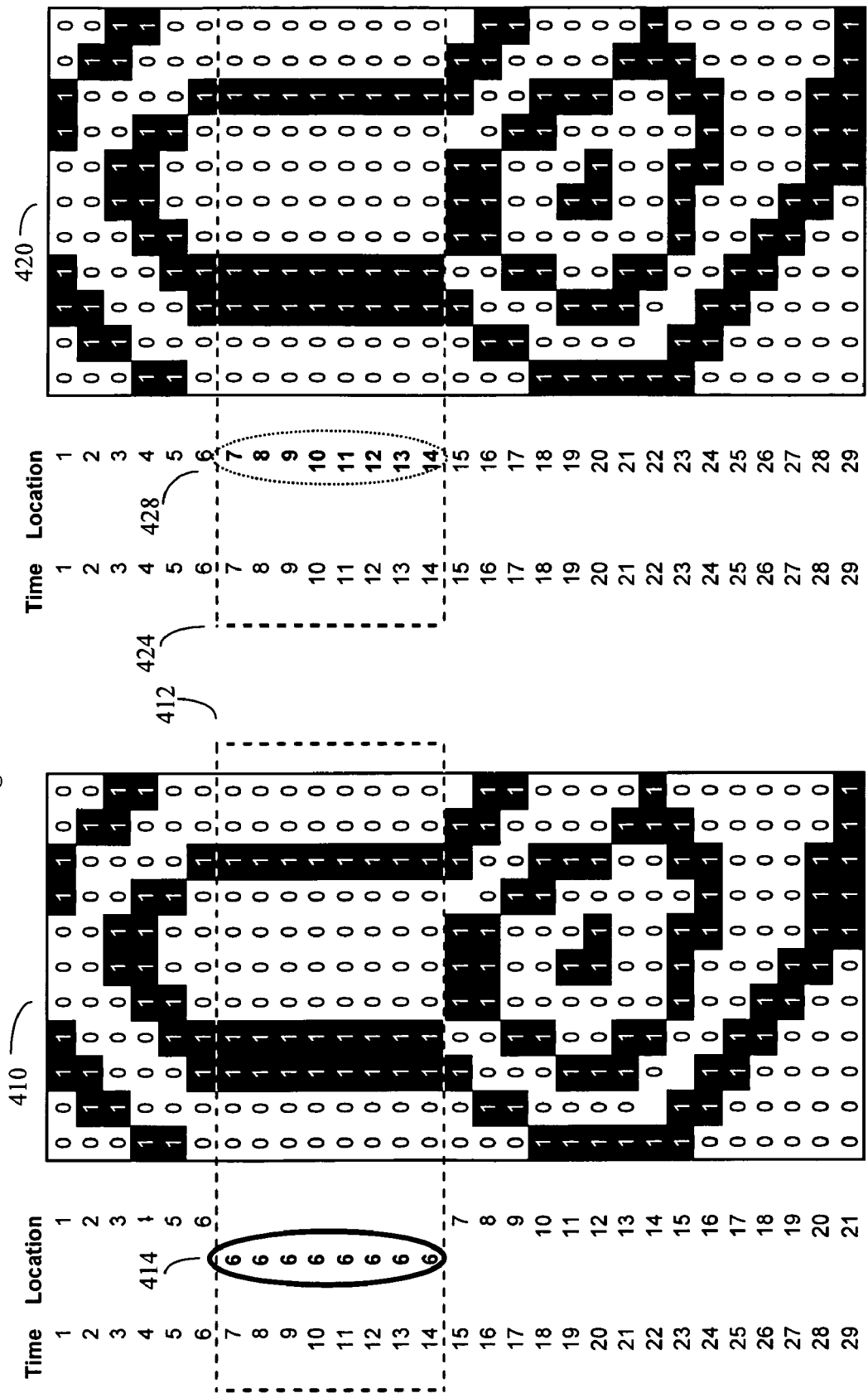
FIG. 4 shows an example of the difference between the artifacts generated when a finger pauses during a swipe, and artifacts generated when a finger encounters stiction during a swipe.

In general, any biometric imaging system that operates on a partial image basis, and that may encounter distortions and artifacts due to improper motion of the biological target relative to the sensor, may be corrected by these methods. Examples of such biometric imaging systems include retinal scans, iris scans, hand prints, finger prints, and other types of scans. Although, throughout this disclosure, fingerprint stiction correction is used as an example of an image artifact that can be corrected by the present invention, it should be understood that the present methods are not limited to either stiction artifacts, or fingerprint scans.

The present invention is particularly useful for removing "stiction" artifacts from fingerprint scans recorded by one-dimensional partial fingerprint sensors. As previously discussed, such one dimensional partial fingerprint sensors generally consist of a linear array of individual sensor units, typically packed closely together at high density, such as a density of about 500 sensing elements (dots) per inch. These individual sensing elements can detect the hills and valleys of the fingerprint ridges. Usually these sensors then digitize this information into an array of integers that characterize the relative elevation of the fingerprint ridges along the one dimensional array of the sensor. These integers are often values between 0-255 to give 8 bits of precision, but other values, such as 1-bit, 2-bit, 4-bit, 12-bit, 16-bit, etc. precision are also quite possible.

As previously discussed, in addition to the actual fingerprint sensing elements, commercially available partial fingerprint sensors, such as the Validity VFS131 and VFS201 sensors, also contain additional sensors that can be used to determine relative finger location or motion as well.

The VFS131, by contrast, uses a series of electrical sensing plates to determine the relative position of the bulk of the finger. In contrast to the electrodes used to determine the fine structure of the fingerprint ridges and valleys, these electrical sensing plates sense the location of the bulk of the finger, and are differentially excited as the finger moves up and down over the course of a finger swipe.

The VFS201 finger location sensor works by a different method. Instead of finger location plates, the VFS201 contains two linear fingerprint sensors, each parallel to each other, and each separated by a distance of about 400 microns from the other. These two fingerprint sensors can be used to deduce fingertip position and velocity because a finger tip or ridge will first pass over one sensor slightly before the other. The relative timing difference between a fingerprint pattern arriving at the first sensor, relative to the same pattern, can be used to derive finger speed. By keeping track of this finger speed history, the relative position of the sensor relative to the finger pad can be computed.

FIG. 1 shows an example of a finger moving over a partial fingerprint scanner. It also shows an example of a momentary stiction event, which has caused a portion of the finger pad to adhere to the partial fingerprint scanner, while the tip of the finger continued in motion. In the top part of FIG. 1, the finger tip (100) moves smoothly and uniformly over the fingerprint sensor (104) which contains a linear array finger print sensor (108) and a VFS201-like fingerprint motion sensor (112). Because the motion of the fingerprint skin over the fingerprint sensor is smooth and uniform, the velocity (116) of the finger pad skin (120) containing the fingerprint is the same as the velocity of the bulk (or tip) of the finger (124).

By contrast the bottom part of FIG. 1 shows what happens during a stiction event. The skin (128) of finger (132) becomes momentarily attached or hung up on the fingerprint sensor (136). As a result, the velocity of the finger pad skin (140) is momentarily slowed down, while the velocity of the bulk or tip of the finger (144) remains relatively constant. Thus the location of the partial fingerprint image relative to the finger pad skin is misreported, and/or (even if no such location data is returned); multiple, and substantially identical, partial fingerprint images of the same portion of the skin pad (128) are returned.

FIG. 2 shows an example of a hypothetical fingerprint that has been captured by a partial fingerprint scanner. In this example, for simplicity, the scanner is depicted as having very low spatial resolution (the linear partial image contains only 11 pixels) and it also has low fingerprint-ridge depth-resolution (here only 1 bit resolution is shown, where 1=a ridge, and 0=a valley). (By contrast, typical partial fingerprint sensors usually have hundreds of detectors (pixels) arranged at high density (approximately 500 dots per inch is common) and with much higher fingerprint depth resolution. However this simplification makes the basic concept easier to explain.)

In this example, the numeric order of the partial image acquisition (each row is a different partial fingerprint image from a linear fingerprint sensor) is the same as the time stamp. (To keep the diagram simple, the numeric order in which the partial images arrive is not shown.) The fingerprint ridges (pixel value of 1) are shown in black to allow these ridges to be more easily visualized. Thus in this example, each linear (one dimensional) partial image is 11 pixels by 1 pixel in size, and in this example, 21 of these linear partial images have been assembled to give a "complete" two dimensional fingerprint scan. In this example, the location on the finger pad where each partial image was obtained (in arbitrary distance units) is shown in the "location" column. This information is normally obtained from a finger position sensor. As can be seen, the full two dimensional fingerprint scan, produced when all 21 partial fingerprint images are assembled, shows a portion of a "loop" fingerprint.

In FIG. 2, the fingerprint scan has gone perfectly. The user has moved the finger over the partial finger print sensor at a uniform and ideal rate of speed, and there has been no stiction. Thus a perfect fingerprint image has been captured.

The time and finger position (location) stamps that are associated with these partial fingerprint images are shown on the "time" and "location" columns. This time and position stamp data can be associated with the partial (one dimensional) fingerprint images by a variety of standard computer memory linkage methods. For example, each partial fingerprint image may contain a pointer to where the additional information associated with that particular partial image may be found in memory. Alternatively, the image annotation data (such as the time stamp and the finger location stamp) can be simply appended onto each partial fingerprint image, and stored in memory along with each partial fingerprint region. Generally, any linking method that reliably links annotation information with the partial fingerprint image data is adequate for these purposes.

FIG. 3 shows an example of a distorted image (artifact) that can result if the user's finger is moved too slowly over the partial fingerprint sensor. In this example, the finger moved with half the speed as previously shown in FIG. 2. Since the linear fingerprint sensor continues to acquire partial fingerprint linear images at the same rate as in FIG. 2, then exactly twice as many partial fingerprint images will be collected during the scan.

Although the resulting fingerprint image looks distorted, there is enough information available to correct for these distortions. This is because each partial image has a time stamp, and by examining time stamps, a fingerprint reconstruction engine (processor), could, for example, correct for this distortion. For example, since the duration was 2× too long, a reconstruction engine could correct by averaging the results from the two nearest neighbor time stamps. Similarly, because (in this example), the finger position where each particular linear partial fingerprint image was taken was also recorded on a position stamp, a processor could also correct for this distortion by a similar process. Thus although the image is distorted by a slower scan, prior art image correction techniques are sufficient to correct for this distortion.

FIG. 4 shows two alternate types of image distortion artifacts, which can be generated by two independent problems. One of these artifacts can be corrected by prior art techniques, and one cannot. In the example on the left (410), the user's finger has momentarily paused (412) while traversing the linear fingerprint sensor. As a result, the fingerprint image appears distorted because the partial fingerprint sensor, which typically will continue acquiring linear partial fingerprint images at constant time intervals, will continue to record the same portion of the fingerprint over and over. When these partial images are reconstructed to produce a complete image, this portion of the image will show up as a distorted region. Although in this example, the time stamps associated with the partial fingerprint regions are not particularly useful at correcting this artifact, the finger position data is useful. As can be seen, in the artifact region (412), the finger position data, as reported by the finger position sensors (414), remains substantially the same. Thus a processor that uses these images to reconstruct a full fingerprint image can be programmed or instructed to skip over (or average out) these repeated fingerprint position scans. When these corrections are applied, the corrected image is once again accurate, and will look like the image shown in FIG. 2.

By contrast, on the left side (420), the finger has suffered from a "stiction artifact" during the scan. As a result of this stiction, a portion of the fingerprint pad has remained over the partial fingerprint sensor (424). However, due to the elastic properties of skin, the tip of the finger has continued to move forward during this time. As a result, neither the time stamp nor the finger position stamp data (428) attached to the partial fingerprint images give information that can be used to correct for this stiction artifact, and any correction processor will be helpless to correct the problem. To solve this problem, a new artifact correction technique is required.

Stiction Removal Method:

The present invention teaches a novel "pattern recognition" way to correct for stiction distortions and artifacts in fingerprint images, and related problems in biometric scans. The invention makes use of the fact that stiction creates a series of repeated or nearly repeated partial fingerprint images, which are usually closely associated together in both time and space. The invention sequentially examines partial fingerprint images, determines if the nearby partial images are "too similar" to each other, and if so deletes or redacts the "too similar" partial images.

To allow the post-redaction partial fingerprint images to be reassembled into a non-distorted, artifact-free complete fingerprint image, the present invention may also adjust the time and location partial image annotation data to correct for the effects of the redaction process. That is, if a gap in the partial image data is caused by the redaction, the present invention may also correct the time or location data associated with the partial fingerprint images to correct for the discontinuities caused by partial image redaction.

Figure 5:
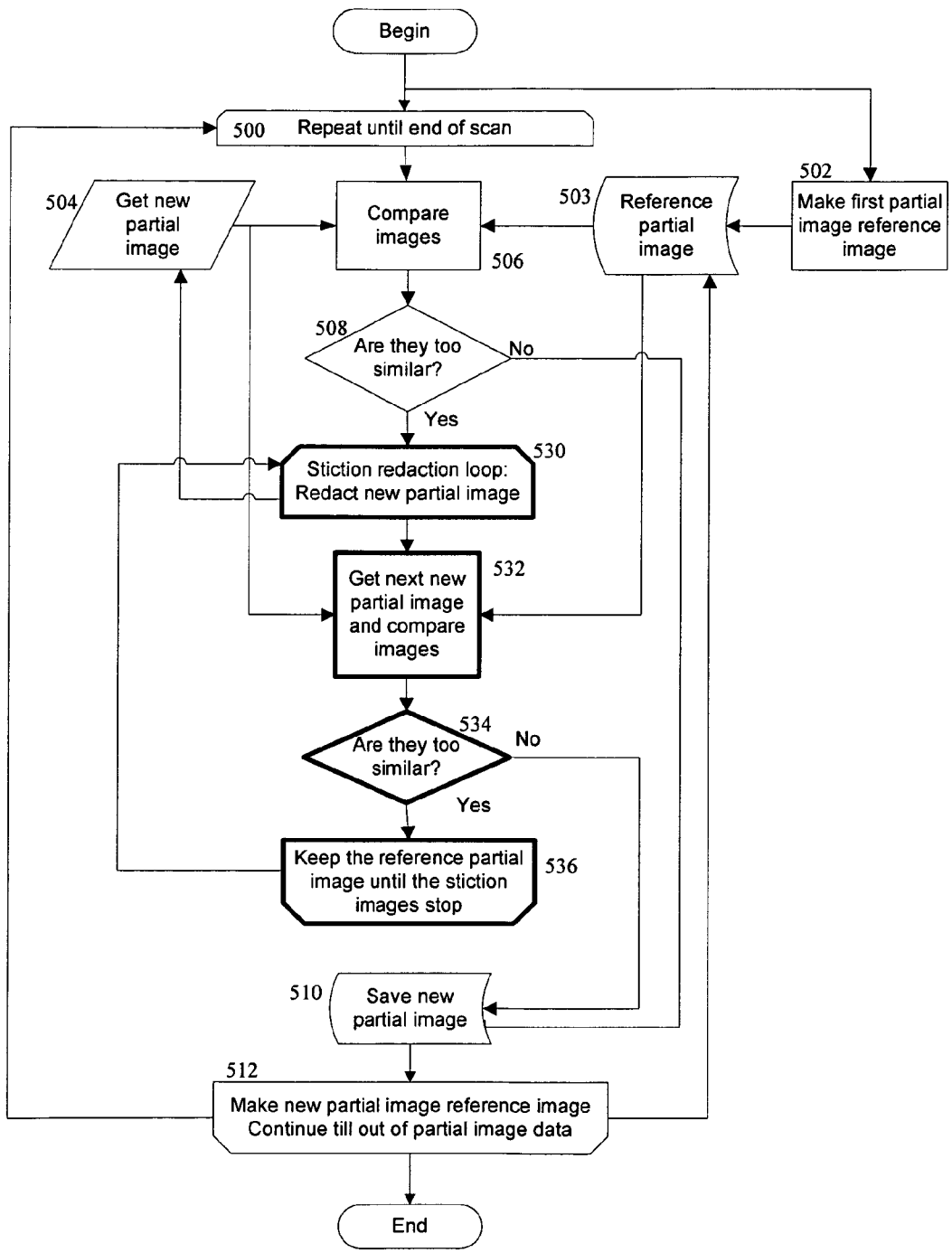
FIG. 5 shows a flow chart of an example algorithm that can be used to determine if partial fingerprint data suffers from stiction artifacts.

The invention can be implemented by a variety of different methods and algorithms, and additionally can be implemented on a wide variety of data manipulation processors, devices and circuitry. A flow chart showing an example of one such method and algorithm is shown in FIG. 5.

In this example, stiction redaction is done by a repetitive series of comparison loops (500) and (530). The process starts by making the first partial image a reference image (502), (503), and getting the next partial image (504). These partial images are compared with a comparison function or algorithm (506). If the results are not "too similar" (508), then it is likely that there is not a stiction problem. In this case, the new partial image is not redacted, but instead is saved for later use (510). This new partial image then becomes the new reference image (512), (502), (503). The loop (500) then repeats with the still newer partial image (504) being fetched, and now being compared with the previous new reference partial image (503).

However if the results are "too similar" (508), then stiction is likely to be a problem, because stiction produces a group of identical or near-identical images. In this case, the algorithm would instead enter a stiction redaction loop (530). In this stiction redaction loop, new partial images are retrieved (504), (532) and compared versus the same initial reference image (503) that was used right before the stiction problem was observed. If these newer partial images are still too similar to the reference image (534), they are also redacted. Here the reference partial image (503) is kept constant until the stiction redaction loop advances past the series of partial images that are "too similar" (536). These loops usually then continue until all partial fingerprint images that make up the fingerprint have been analyzed.

The redaction can be done by simply not saving the partial fingerprint images, or discarding the partial fingerprint images. Alternatively, the multiple redacted partial fingerprint images may be averaged or analyzed to produce a single overall partial image that is an idealized version of the redacted region, and this single idealized partial image used as one of the partial image frames in the final complete fingerprint image.

Stiction Detection Algorithms:

A large number of different stiction detection algorithms can be used. Here are a few examples are discussed.

As one example of a stiction detection algorithm in operation, consider the results that would happen in the FIG. 4 (420) stiction example when the regions bordering the stiction event (424) are analyzed using the algorithm from FIG. 5, and a simple comparison algorithm.

In this example, assume that the algorithm from FIG. 5 is being used to analyze the data from FIG. 4 (420). Also assume that the algorithm is at the point where it is using the 11×1 pixel linear partial image from time row "5" as the "reference" partial image (503), and the 11×1 pixel linear partial image from time row "6" as the "new" image (504), In one embodiment, a comparison algorithm (506) can be as simple as computing the sum of the absolute value of the differences between each individual time value "5" partial image pixel, and the corresponding pixel in the time value "6" partial image. Here this "sum of differences" is then compared to a similarity criteria value "s", and the final result is tested to see if it is greater than zero or not. If the final result is zero or negative, the two partial images would be considered to be "too similar". If the final result is greater than zero, the two partial images are considered to be OK (not too similar). This function is shown mathematically in equation 1 below:

Equation 1:

$$\text{similarity} = \sum_{i=0}^{n} |\text{reference\_pixel}(i) - \text{new\_pixel}(i)| - s$$

Many other alternative similarity functions may also be used. For example, similarity functions can be absolute values, root mean functions, root mean square functions, polynomial functions, etc. More elaborate functions where different pixels are differentially weighed, or nearby pixels compared, can also be done. For example, pixels near the center of the image may be more heavily weighted than pixels on the sides of the image.

In the following examples, the similarity value "s" is set to be 1. Note that with this scheme, identical partial fingerprint images would give a similarity value of −1, and partial fingerprint images that differ by only one pixel would give a similarity value of zero.

As shown in table 1 below, the partial image at time row "6" is not "too similar" to the reference partial image at time row "5" because the similarity function gives a value of 4 (difference sum of 5 minus an "s" of 1=4), which is greater than zero.

TABLE 1

Result when new partial image is different from the reference partial image.

| | | | Pixel | | | | | | | | | | |
|---|---|---|---|---|---|---|---|---|---|---|---|---|---|
| | Time | Location | 1 | 2 | 3 | 4 | 5 | 6 | 7 | 8 | 9 | 10 | 11 |
| Reference image | 5 | 5 | 1 | 0 | 0 | 1 | 1 | 0 | 0 | 1 | 0 | 0 | 0 |
| New image | 6 | 6 | 0 | 0 | 1 | 1 | 0 | 0 | 0 | 0 | 1 | 0 | 0 |
| |Difference| | | | 1 | 0 | 1 | 0 | 1 | 0 | 0 | 1 | 1 | 0 | 0 |
| Total difference | | | | | | | 5 | | | | | | | |

However at the next step in FIG. 4, we can visually see that stiction is starting, and the algorithm can pick this up as well. Consider the results when the algorithm now advances forward and starts analyzing the new partial image from time row "7", using the partial image from time row "6" as a reference image (503). As shown in table 2, the results (reported in 508) are now "too similar".

TABLE 2

Result when new partial image is similar to the reference partial image

| | | | Pixel | | | | | | | | | | |
|---|---|---|---|---|---|---|---|---|---|---|---|---|---|
| | Time | Location | 1 | 2 | 3 | 4 | 5 | 6 | 7 | 8 | 9 | 10 | 11 |
| Reference image | 6 | 6 | 0 | 0 | 1 | 1 | 0 | 0 | 0 | 0 | 1 | 0 | 0 |
| New image | 7 | 7 | 0 | 0 | 1 | 1 | 0 | 0 | 0 | 0 | 1 | 0 | 0 |
| |Difference| | | | 0 | 0 | 0 | 0 | 0 | 0 | 0 | 0 | 0 | 0 | 0 |
| Total difference | | | | | | | 0 | | | | | | | |

Thus the similarity is the sum of the differences (0) minus "s" (1), or −1, which is less than or equal to zero. Thus comparison algorithm (508) concludes that partial image time row "7" suffers from stiction. As a result, partial image time row "7" is redacted. Here the redaction process is simple because, in this example, partial image time row "7" is not saved (510), and in this example would thus be considered to be deleted or redacted. The algorithm continues to use partial image time "6" as the reference partial image (503).

When the algorithm then advances forward and uses partial image time "8" as the new partial image, it will again see that the difference is too small, and again partial image time "8" will be redacted (not saved (510)) as well, and partial image time "6" will continue to serve as the reference image. This state of affairs continues through partial images "9", "10", "11", "12", "13", and "14" as well. The comparison algorithm (532), (534) inside the redaction loop (530) (which can be the same algorithm as used in (508), concludes that these images all suffer from stiction, and they are all redacted (510) or "not saved".

However when the algorithm finally advances to examine new partial image time (15), a different result is obtained. Here reference partial image time row "6" is still being used as the reference partial image (503), and the new image (504) is now the partial image from time row "15". Here the comparison algorithm once again detects that this particular combination is not "too similar".

This region is also sufficiently different from reference image time "15", so again new partial image time "16" is saved, and new partial image time "16" becomes the new partial image reference image. The algorithm also examines partial images time "17" to "29", determines that none of the rest of these partial images suffer from stiction, and thus saves (510) the remainder of these images.

In order to help another processor later use these saved partial images to produce a distortion free complete fingerprint image, the algorithm may optionally also correct any location data or time data linked to the various partial images. For example, the location information that is linked to the various partial images could be corrected for errors caused by the stiction event.

In this example, after the algorithm of FIG. 5 was applied to the data from FIG. 4, it was found that the location information was incorrect because the partial images in time rows "7" to "14" suffered from stiction. As a result, the same part of the finger pad was read over and over, and the location data (428) reported by the finger print position sensor was incorrect. Instead of the partial fingerprint sensor reading finger locations 7-14, in actuality it just read finger location 6 over

TABLE 3

Result obtained after the region suffering from stiction has passed.

|  | Time | Location | Pixel | | | | | | | | | | |
| --- | --- | --- | --- | --- | --- | --- | --- | --- | --- | --- | --- | --- | --- |
|  |  |  | 1 | 2 | 3 | 4 | 5 | 6 | 7 | 8 | 9 | 10 | 11 |
| Reference image | 6 | 6 | 0 | 0 | 1 | 1 | 0 | 0 | 0 | 0 | 1 | 0 | 0 |
| New image | 15 | 15 | 0 | 0 | 1 | 0 | 1 | 1 | 1 |  | 1 | 1 |  |
| \|Difference\| |  |  | 0 | 0 | 0 | 1 | 1 | 1 | 1 | 0 | 0 | 1 | 0 |
| Total difference |  |  |  |  |  |  | 5 |  |  |  |  |  |  |

Here the similarity value is 5−1 or 4, which is greater than zero. Thus the test (534) concludes that the two partial images are not too similar, and the algorithm exits the redaction loop (530), (536) at exit point (534). Partial image time row "15" is saved (not redacted) (510), and partial image time row "15" also becomes the new reference image (512), (503).

After the region of stiction has passed, the rest of the image is processed without any stiction redaction. Here is an example of what happens in the next partial image time row "16".

and over again. All the finger location data after time row "6" are thus incorrect. All the non-redacted partial fingerprint images after time row "6" are 8 finger pad location units too large.

To reduce the severity of this problem, the algorithm may optionally make corrections to the location information associated with the various partial images in order to compensate for this effect. Here, this correction would be to simply subtract the apparent distance of the redacted partial images from the location data of the images after the redaction.

TABLE 4

Operation continuing past the stiction region of the fingerprint.

|  | Time | Location | Pixel | | | | | | | | | | |
| --- | --- | --- | --- | --- | --- | --- | --- | --- | --- | --- | --- | --- | --- |
|  |  |  | 1 | 2 | 3 | 4 | 5 | 6 | 7 | 8 | 9 | 10 | 11 |
| Reference image | 15 | 15 | 0 | 0 | 1 | 0 | 1 | 1 | 1 |  | 1 | 1 |  |
| New image | 16 | 16 | 0 | 1 | 0 | 0 | 1 | 1 | 1 | 0 | 0 | 1 | 1 |
| \|Difference\| |  |  | 0 | 1 | 1 | 0 | 0 | 0 | 0 | 0 | 1 | 0 | 1 |
| Total difference |  |  |  |  |  |  | 4 |  |  |  |  |  |  |

Figure 6:
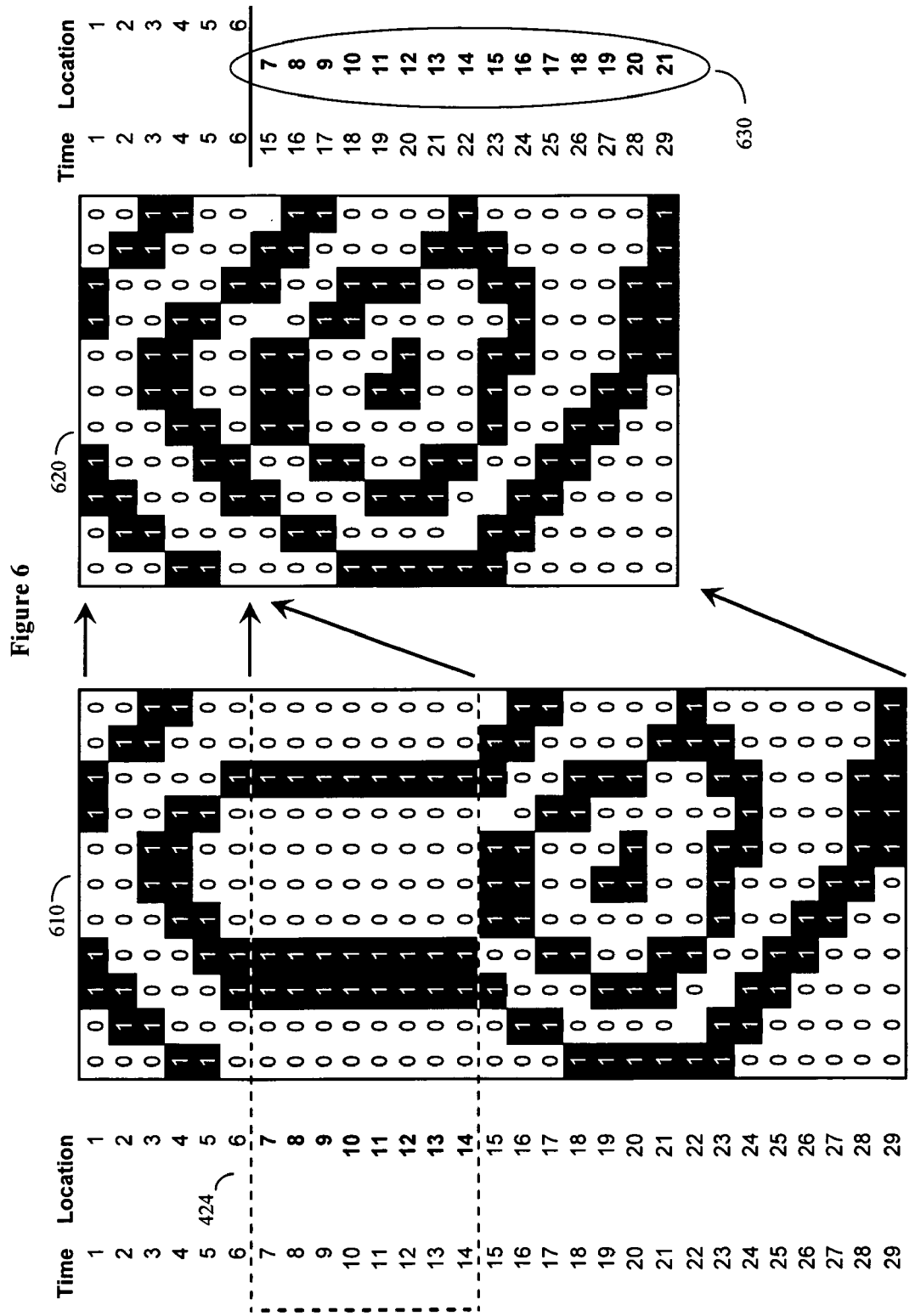
FIG. 6 shows an example of how the stiction removal method can correct distorted fingerprint images by redacting distorted regions of the fingerprint image.

FIG. 6 shows the effect of this correction process on the raw data. The raw data is shown as (610), and the stiction corrected image is shown as (620). Note also that in this example, the distance data that is associated with the particular partial images was corrected to account for the error caused by stiction (630).

One advantage of this method is that it requires a relatively minimal amount of memory, processing circuitry, and electrical power to implement. Instead of storing the complete, and potentially quite large, fingerprint scan in memory, only a small portion of the fingerprint scan need to be stored in memory. Instead of performing image analysis on a large number of finger print data pixels or sensor elements, the processor or circuitry need only to compare a small number of neighboring partial fingerprint images for approximate similarity.

Because the memory, processing circuitry, and algorithms are relatively simple, the stiction redaction method of the present invention may be implemented on a relatively simple circuit. In one embodiment, the processing circuitry needed to implement this stiction reduction method may be implemented or placed on the same integrated circuit chip that is used to drive the partial fingerprint sensor.

This embodiment simplifies overall circuit design, because the circuitry needed to implement stiction reduction need only operate when the fingerprint sensor itself is operated. In one configuration, the stiction reduction circuitry can intercept the partial fingerprint data as it is generated by the partial fingerprint sensor IC driver chip, perform the needed stiction corrections, and the output from the partial fingerprint sensor can then automatically provide the corrected fingerprint data. This simplifies the task of any subsequent processor that might do analysis on the fingerprint image because this image has been "cleaned up". This in turn creates a faster, lower power, and cheaper system.

Figure 7:
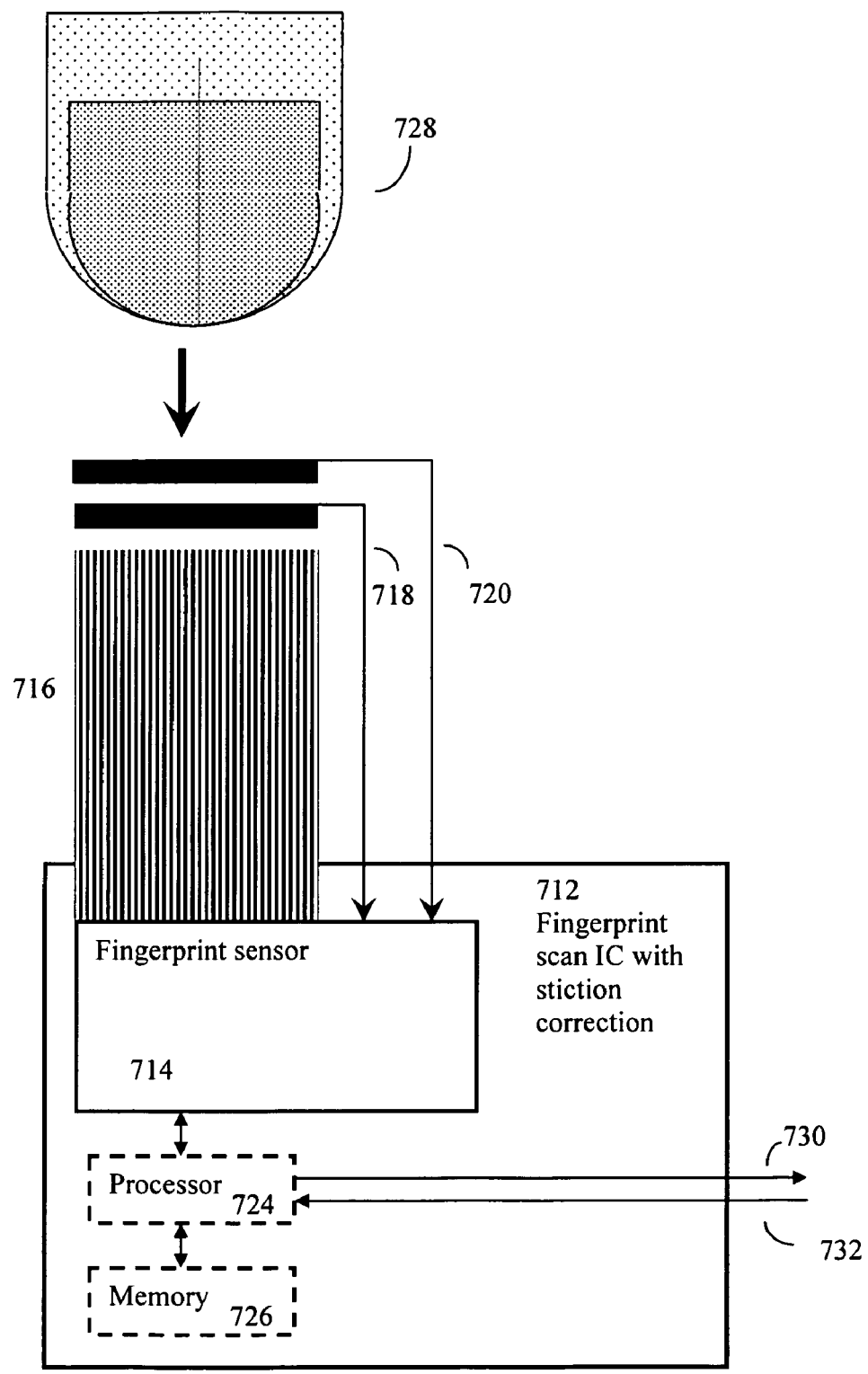
FIG. 7 shows an example of a partial fingerprint scanner and a scanner driver IC chip that incorporates on-chip stiction removal circuitry.

FIG. 7 shows an example of an integrated circuit chip used to drive a partial fingerprint sensor. Here, the electronic chip drives a deep finger penetrating radio frequency (RF) based partial fingerprint scanner. Electronic chip (712) contains the circuitry (714) needed to drive both the excitation lines (716) and the detectors (718), (720) needed to detect the ridges and valleys present in a human finger. Electronic chip (712) may additionally contain a microprocessor core (724), such as an ARM or MIPS or 8051 or x86 or MSP430 or other processor core or logic comparison circuits, and memory (726) which may be composed of volatile memory (such as RAM), or non volatile memory (such as FLASH or EEPROM) and may be compartmentalized into various types and security levels as appropriate. Here memory (726) can store the stiction correction algorithm (in a non-volatile portion of memory), and can also serve as a cache to store the various partial fingerprint images, including at least the reference partial image and usually at least one new partial fingerprint image. The memory can also contain scratchpad memory for the intermediate algorithm corrections as well.

In operation, the fingerprint scan IC can correct stiction artifacts in a manner that is almost transparent to any additional processors residing outside of the IC. Stiction artifacts can be quickly and economically removed, and then output (730). Subsequent fingerprint recognition systems will be simplified because there is a higher assurance that distortion free fingerprints will be output by scanner chip (712). Scanner chip (712) can also receive commands (732) from outside circuitry to change its particular image correction algorithms, or even pass (transmit) raw (uncorrected) partial fingerprint image data directly, as needed.

In use, a user finger (728) is swiped across the sensing elements (716), (718), (720), and the fingerprint sensor module (714) of the chip (712) retrieves the data, in this case in either a time-sequential or all at once manner. Here time sequential means that only a part of the biometric data (such as a portion of the finger) is obtained at any one instant of time, and various partial portions of the biometric data can then be assembled to construct the full set of data. Here, for example, partial fingerprint data can be obtained over the time course of the finger swipe and later assembled to construct a complete fingerprint.

The invention claimed is:

1. A method to correct artifacts in a biometric image assembled from a plurality of partial biometric images, comprising:

acquiring a first partial biometric image as a reference image;

performing a comparison between the reference image and a second subsequent partial biometric image using a comparison function;

determining if the result of using the comparison function to compare the reference image and the second subsequent partial biometric image is less than a preset limit;

if the result is less than the preset limit, discarding the second subsequent partial biometric image;

if the result is not less than the preset limit, setting the second subsequent partial biometric image as the reference image;

repeating the performing, determining, discarding, and setting steps until the comparison is performed for each of the plurality of partial biometric images;

reassigning one of a time stamp and a position indicator for remaining subsequent partial biometric images subsequent to any discarded partial biometric image or images by using the difference in the time stamp or position indicator between a partial biometric image just prior to a first discarded partial biometric image in the any discarded partial biometric image or images and a partial biometric image subsequent to a last discarded partial biometric image in the any discarded partial biometric image or images, and utilizing one of the reassigned time stamp and position indicator for each remaining subsequent partial biometric image, unless and until a further reassigning step occurs, to assemble the plurality of partial biometric images into a redacted biometric image.

2. The method of claim 1, in which the redacted biometric image comprises a fingerprint image, and the respective partial biometric images each comprise a partial fingerprint image.

3. The method of claim 1, in which the artifact comprises an artifact selected from a group consisting of a stiction artifact, a retinal movement artifact, and an iris movement artifact.

4. The method of claim 1, in which the redacted biometric image is subsequently analyzed versus a database of authorized biometric images for security verification purposes.

5. The method of claim 1, in which discarding is performed by utilizing an averaging function performed over the range of at least two partial biometric images, to provide a single average image substituted for the range of discarded partial biometric images.

6. A method to reduce the distorting effect of stiction on fingerprint images assembled from a plurality of partial fingerprint images, said method comprising:
acquiring a first partial fingerprint image as a reference image;
performing a comparison between the reference image and a second subsequent partial fingerprint image using a comparison function;
determining if the result of using the comparison function to compare the reference image and the second subsequent partial fingerprint image is less than a preset limit;
if the result is less than the preset limit, discarding the second subsequent partial fingerprint image;
if the first result is not less than the preset limit, setting the second subsequent partial fingerprint image as the reference image;
repeating the performing, determining, discarding, and setting steps until the comparison is performed for each of the plurality of partial fingerprint images;
reassigning one of a time stamp and a position indicator for remaining subsequent partial fingerprint images subsequent to any discarded partial fingerprint image or images by using the difference in the time stamp or position indicator between a partial fingerprint image just prior to a first discarded partial fingerprint image in the any discarded partial fingerprint image or images and a partial fingerprint image subsequent to a last discarded partial fingerprint image in the any discarded partial fingerprint image or images, and utilizing one of the reassigned time stamp and position indicator for each remaining subsequent partial fingerprint image, unless and until a further reassigning step occurs, to assemble the plurality of partial fingerprint images into a redacted biometric image.

7. The method of claim 6, in which the partial fingerprint images are obtained using a sensor composed of a linear array of individual sensing elements.

8. The method of claim 6, in which the partial fingerprint images are obtained using a deep finger penetrating radio frequency (RF) based sensor.

9. The method of claim 6, in which the one of the time stamp and the position indicator associated with each respective partial fingerprint image shows a respective order in which the partial fingerprint image was acquired.

10. The method of claim 9, in which the partial fingerprint images are obtained using a sensor with sensing elements capable of sensing relative finger location or movement.

11. The method of claim 10, in which each location indicator indicates a finger pad location in which the partial fingerprint image was acquired.

12. The method of claim 6, in which the comparison function computes a sum of the differences between a respective partial fingerprint image and an adjacent partial fingerprint image.

13. The method of claim 12, in which the comparison function computes the absolute value of the sum of the differences.

14. The method of claim 6, in which the comparison function computes a sum of the squares or a higher polynomial value of the respective differences.

15. A system comprising:
a biometric image acquisition unit configured to acquire a first partial biometric image as a reference image;
a comparator configured to perform comparison between the reference image and a second subsequent partial biometric image using a comparison function;
the comparator configured to determine if the result of using the comparison function to compare the reference image and the second subsequent partial biometric image is less than a preset limit;
a controller configured to, if the result is less than the preset limit, discard the second subsequent partial biometric image;
the controller further configured to, if the result is not less than the preset limit, set the second subsequent partial biometric image as the reference image;
the controller further configured to repeat the performing, determining, discarding, and setting, until the comparison is performed for each of the plurality of partial biometric images;
the controller further configured to reassign one of a time stamp and a position indicator for remaining subsequent partial biometric images subsequent to any discarded partial biometric image or images by using the difference in the time stamp or position indicator between a partial biometric image just prior to a first discarded partial biometric image in the any discarded partial biometric image or images and a partial biometric image subsequent to a last discarded partial biometric image in the any discarded partial biometric image or images, and utilizing one of the reassigned time stamp and position indicator for each remaining subsequent partial biometric image, unless and until a further reassigning step occurs, to assemble the plurality of partial biometric images into a redacted biometric image.

16. The system of claim 15, in which the distortion is a distortion caused by stiction.

17. A tangible machine readable media storing instructions that, when executed by a computing device, cause the computing device to perform a method, the method comprising:
acquiring a first partial biometric image as a reference image;
performing a comparison between the reference biometric image and a second subsequent partial biometric image using a comparison function;
determining if the result of using the comparison function to compare the reference image and the second subsequent partial biometric image is less than a preset limit;
if the result is less than the preset limit, discarding the second subsequent partial biometric image;
if the result is not less than the preset limit, setting the second subsequent partial biometric image as the reference image;

repeating the performing, determining, discarding, and setting steps until the comparison is performed for each of the plurality of partial biometric images; and reassigning one of a time stamp and a position indicator for remaining subsequent partial biometric images subsequent to any discarded partial biometric image or images by using the difference in the time stamp or position indicator between a partial biometric image just prior to a first discarded partial biometric image in the any discarded partial biometric image or images and a partial biometric image subsequent to a last discarded partial biometric image in the any discarded partial biometric image or images, and utilizing one of the reassigned time stamp and position indicator for each remaining subsequent partial biometric image, unless and until a further reassigning step occurs, to assemble the plurality of partial biometric images into a redacted biometric image.

18. The tangible machine readable media of claim 17, in which the acquisition of partial fingerprint images comprises using deep finger penetrating radio frequency (RF) circuitry.

* * * * *